United States Patent [19]

Rüffer et al.

[11] Patent Number: 4,483,350

[45] Date of Patent: Nov. 20, 1984

[54] DEVICE FOR CHARGING CIGARETTE MACHINES WITH TOBACCO

[75] Inventors: Alfred Rüffer; Johannes Haas; Karl W. Quester, all of Cologne, Fed. Rep. of Germany

[73] Assignee: Firma Wilh. Quester, Fed. Rep. of Germany

[21] Appl. No.: 392,588

[22] Filed: Jun. 28, 1982

[30] Foreign Application Priority Data

Jun. 27, 1981 [DE] Fed. Rep. of Germany ....... 3125427

[51] Int. Cl.³ ............................................. A24C 5/39
[52] U.S. Cl. .................................... 131/108; 131/110
[58] Field of Search .......... 131/909, 280, 108, 109 R, 131/110, 109 AB; 406/400, 89, 91, 85, 95, 138, 142; 198/766

[56] References Cited

U.S. PATENT DOCUMENTS 4,390,029 6/1983 Leckband et al. ................. 131/108

Primary Examiner—Vincent Millin
Attorney, Agent, or Firm—Diller, Ramik & Wight

[57] ABSTRACT

This disclosure is directed to a device for charging cigarette machines with tobacco and includes a collection area of a generally trough-like configuration including a bottom defined by an endless conveyor entrained about rollers, and a plurality of suction tubes having terminal end portions thereof disposed within the collection area and adjacent the upper flight of the conveyor whereby tobacco upon the upper conveyor flight can be withdrawn therefrom by the suction tubes for feeding or charging associated cigarette machines.

17 Claims, 4 Drawing Figures

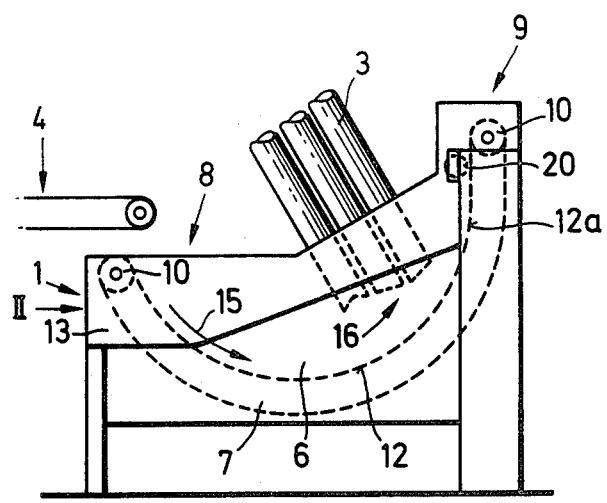
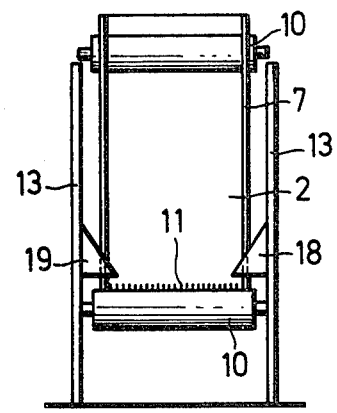
FIG. 1 　　　　　FIG. 2
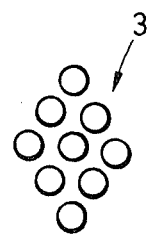
FIG. 3

DEVICE FOR CHARGING CIGARETTE MACHINES WITH TOBACCO

This invention relates to a novel device for charging cigarette machines with tobacco, such as in the case of shredded tobacco which is supplied to a central collecting location and from the latter, the shredded tobacco is conveyed through suction or pneumatic tubes to the individual cigarette or cigarette-forming machines.

It is conventional to charge or supply cigarette-forming machines with tobacco by first supplying the prepared shredded tobacco to a collecting location by means of conveyors or the like and then removing this tobacco from the collection location by suction through pneumatic conduits which lead to the individual cigarette or cigarette-making machines. In conventional machines for charging cigarette machines in this fashion, the tobacco is abused and the strands of the shredded tobacco are frequently broken-up thereby forming undesired or unwanted tobacco shortenings. Furthermore, disintegration of the tobacco easily occurs when the collection locations are additionally subject to vibration as might be the case to augment the flow or delivery of tobacco.

A primary object of the present invention is, therefore, to provide a novel device for charging cigarette-making machines with tobacco through the utilization of pneumatic or suction conduits but doing so without adversely affecting the tobacco, disintegrating the same, disrupting the supply, and doing so in a uniform and efficient manner.

The present invention is particulary characterized in that means are provided for establishing a collection area or location in the form of a trough-shaped configuration, considered in longitudinal section, with a bottom thereof being formed by a conveyor and preferably by an upper flight or reach of an endless conveyor or conveyor band, and suction or pneumatic tubes are positioned in the cluster with ends thereof generally within the trough-shaped collection area and adjacent the upper reach or flight of the conveyor to pneumatically withdraw the tobacco from the trough-shaped collection area and to deliver the same to associated cigarette-making machines.

By constructing the charging device in this fashion, the tobacco or any similar commodity is kept in constance turbulence within the trough-shaped collection area immediately adjacent the ends of the suction tube and, thus, the tobacco can not disintegrate. At the same time, the tobacco or a like commodity is sufficiently accumulated so that a uniform removal of the tobacco through the individual suction conduits of the cluster of conduits or tubes is ensured. As a result, the tobacco is treated gently, and the strands do not suffer damage or disruption as the tobacco is continuously circulated within the trough-shaped collection area by the continuous motion of the upper flight of the conveyor. The latter continuous motion of the upper flight of the conveyor within the trough-shaped collection area also brings the tobacco to a position relatively close to the openings of the suction conduits thereby also assuring an adequate supply of the tobacco and a regular delivery thereof to the individual cigarette machines.

The endless conveyor is preferably guided around guide rollers at inlet end portions and outlet end portions of the conveyor which also define inlet end portions and outlet end portions of the trough-shaped collection area, and the endless conveyor bands also have entrainment means or entrainment strips set thereon to assure the entrapment and delivery of the tobacco during the motion imparted thereto by the conveyor. The entrainment strips are preferably integral formed portions of the conveyor disposed in generally parallel spaced relationship defining slots or grooves therebetween within which the tobacco is collected and is, thus, moved thereby upon motion being imparted to the conveyor. Furthermore, the trough-shaped configuration of the collection area is additionally set-off by spaced side walls adjacent lateral edges of the endless conveyor which preclude the tobacco or like commodities from falling from the up conveyor flight during the operation of the device.

In further accordance with the invention, the plurality of suction tubes are preferably disposed with terminal end portions thereof in one or more clusters, as viewed in the direction of conveyance of the upper conveyor reach or flight, and are directed into the trough-shaped collection area from about the middle to the outlet end portion of the conveyor whereby the delivery of the tobacco into the trough-shaped collection area may take place upstream or downstream of these suction tubes. In this way, it is ensured that the terminal end portions or intake ends of the suction tubes are positioned within the tobacco accumulating to a greater or lesser extent upstream of such suction tubes ends whereby an even supply of the tobacco to the suction tubes is achieved. Moreover, there remains in the trough-shaped collection area sufficient room for the delivery thereinto a new supply of the tobacco or like commodity as dictated by supply and/or demand.

In further accordance with this invention, guide members, such as brushes, may be provided at the side walls adjacent the endless conveyor or conveyor band forming the bottom of the trough-shaped collection area to keep lateral edges of the endless conveyor free of the tobacco (commodity). The guide members are so positioned that they serve for guiding the upper reach of the freely suspended endless conveyor whereby a suitable running radius may be prescribed for the upper reach of the conveyor as it follows the trough-shaped configuration of the collection area which it, itself, defines. The charging device is preferably in part formed by a casing opened from above with guide rollers being supported by the casing walls with, of course, the endless conveyor being entrained about the guide rollers. Furthermore, guiding devices, such as sheet-metal deflectors, stripper rolls, or the like, may be arranged at the outlet end portion of the endless conveyor to hold back tobacco which has not been removed by suction, and, thus, assure its continued recirculation in the trough-shaped collection until withdrawn by the suction tubes. Because of this, tobacco which is not initially moved by the suction is again returned into the general tobacco flow and eventually can be removed through the suction tubes. If found necessary or desirable, brush scrapers or the like may be arranged at the outlet end portion or exit end of the conveyor for cleaning the latter.

With the above and other objects in view that will hereinafter appear, the nature of the invention will be more clearly understood by reference to the following detailed description, the appended claims and the several views illustrated in the accompanying drawings.

IN THE DRAWINGS

FIG. 1 is a schematic side elevational view of a novel device for charging cigarette machines with tobacco in accordance with this invention, and illustrates an endless conveyor defining a trough-shaped collection area into which tobacco is deposited and a plurality of suction tubes which pneumatically extract the tobacco from the collection area.

FIG. 2 is a diagrammatic end elevational view taken generally along line II of FIG. 1, and illustrates the charging device in the absence of the suction tubes.

FIG. 3 is a diagrammatic transverse section view through the cluster of suction tubes, and illustrates the configuration thereof.

Figure 4:
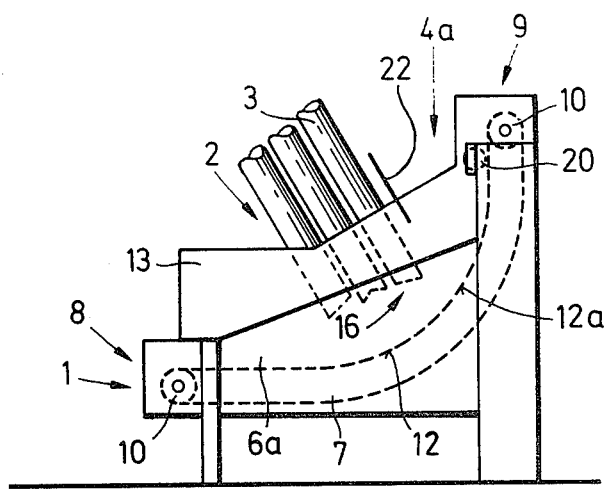
FIG. 4 is a schematic side elevational view of another cigarette machine charging device, and in this case the trough-shaped collection area is fed tobacco adjacent an outlet end portion thereof.

A novel device for charging cigarette machines with tobacco or a like commodity in accordance with this invention is generally designated by the reference numeral 1 and includes an overall frame or casing which sets off and in part defines a collection location or area 2 for the shredded tobacco with the collection area 2 being of a generally trough-shaped configuration opening concavely upwardly. A plurality of suction tubes 3 or the like (FIGS. 1 and 3) are arranged in a desired cluster, as in FIG. 3, and terminal end portions thereof (unnumbered) are positioned within the trough-shaped collection area 2. Suction tubes 3 are designed to pneumatically withdraw tobacco from the trough-shaped collection area 2 and deliver the same to a plurality of individual cigarette or cigarette-forming machines (not shown). The tobacco or a like commodity is supplied to the trough-shaped collection area 2 by means of conventional conveying equipment 4.

The collection area or location 2 defines a generally trough-shaped space or volume 6, the bottom of which is formed by an upper reach or flight (unnumbered) of a traveling endless band, conveyor, or endless conveyor 7. The endless conveyor 7 includes a feed and/or input end 8 which is slightly lower than an outrunning or outlet end 9 to define the trough-shaped receptacle space or volume 6. The endless conveyor 7 is entrained about guide rollers 10, 10 and the endless conveyor 7 may further be provided with entrainment means 11 or entrainment strips. The entrainment means or strips 11 are simply a plurality of space, parallel strips peripherally bounding the endless conveyor 7 defining channels within which the tobacco is entrained and, thus, it is moved upon the motion of the conveyor 7. Preferably, the direction of drive of the endless conveyor 7 is such that an uppermost reach or flight 12 thereof is moved in the direction of the headed arrow 15 in FIG. 1 from the left-handmost roller 10 to the right-handmost and higher guide roller 10 in this same figure. Furthermore, the upper reach 12 and the entire conveyor 7 is laterally bounded by side walls 13, 13 (FIG. 2).

The suction tubes 3 are also inclined slightly in the direction of the movement 15 of the upper reach or flight 12 of the conveyor 7 and the ends of the suction tubes 3 lie generally in a plane indicated by the reference numeral 16 and the arrow associated therewith which can be adjusted in inclination approximately to that of the inclination of a steep portion 12a of the upper reach 12 of the conveyor 7. The latter provides a free space upstream of the suction tubes 3 into which a sufficient amount of the tobacco can be dumped or deposited from the conveying equipment 4 and, thus, transferred in the direction of the arrow 15 along the upper reach 12 toward and to the suction tubes 13 for the pneumatic withdrawal therefrom for delivery to associated cigarette-forming machines.

Adjacent the latter walls 13 along the upper reach 12 of the conveyor 7 there are provided guide means in the form of lateral guide members 18 and 19 which keep lateral edges (unnumbered) of the upper reach 12 free of the tobacco. The guide members 18, 19 can at the same time be so formed that they serve for guiding the freely-suspended upper reach 12 of the conveyor 7. The latter is best illustrated in FIG. 2 wherein the guide members 18, 19 engage the lateral edges of the upper reach 12 of the conveyor 7 and assure that the upper reach 12 follows the trough-like configuration best shown in FIG. 1 in its freely suspended state between the guide rollers 10, 10. Because of this, the collecting space or receptacle space 6 is appreciably great or deep and, thus, any tobacco which is not collected or withdrawn by the suction tubes 3 can be recirculated in this area since there is sufficient room provided by the depth of the trough-shaped receptacle space 6. Furthermore, while the guide members 18,19 are shown as stationary deflectors, they may accomplish the same guiding function if formed as brushes, and the latter modification is considered to be within the scope of this invention.

At the outrunning or outlet end 9 of the conveyor 7, there are preferably provided devices for holding back or restraining the tobacco from being discharged by the conveyor 7 outwardly of the device 1. These devices may be in the form of sheet-metal deflectors and/or stripper rolls 20 or the like. These devices 20 serve at the same time to clean the conveyors 7 so that the conveyor 7 is freed from the commodity which may still adhere thereto adjacent the upper right-handmost guide roller 10 in FIG. 1.

Reference is now made to FIG. 4 of the drawings in which a similar device for charging cigarette machines with tobacco is shown and bears like numerals to those of FIGS. 1 and 2. In FIG. 4, a trough-shaped receptacle space or trough-shaped collection area is generally designated by the reference numeral 6a, and the same follows a flatter course at the left-hand end than that of the like end of the device 1 of FIG. 1. Thus, the group of suction tubes 3 in FIG. 4. extend to a shallower depth within the trough space 6a than they extend in the same space 6 of the device of FIG. 1. The supplying of the tobacco can, in the instance of the device in FIG. 4, take place downstream of the grouped suction tubes 3 in the trough space or area 6a, as indicated by the arrow 4a in FIG. 4 indicating the downward flow of tobacco being charged into the device 1 of FIG. 4. Thus, a suitable shielding plate 22 is provided adjacent the suction tubes to guide any of the tobacco downwardly into the trough and upon the comparatively more steeply inclined portion 12a of the upper reach 12 of the conveyor 7 of FIG. 4. Thus, as compared to the device of FIG. 1, the device of FIG. 4 is charged to the right of the suction tubes 3 whereas in FIG. 1, the device is charged to the left of the suction tubes 3.

In either event, the commodity, be it shredded tobacco or the like, is supplied in adequate quantities into the trough-like spaces or areas 6 or 6a. In doing so, the tobacco is taken along from upstream of the inclined plate 16 of the suction tubes 3 more or less upwardly lengthwise of the comparatively-steeply-inclined portion 12a of the upper reach or flight 12 of the conveyor 7, whereby the commodity (tobacco) again falls back upstream of the outlet end 9 of each of the conveyors 7 so that the tobacco is kept in constant turbulent generally recirculating motion in the space upstream of the inclined plane 16 of the suction tubes 3. Because of this motion and the recirculation thereof, the tobacco can not disintegrate and on the contrary, the tobacco is presented in a continuously mixed condition directly to the inlet ends (unnumbered) of the suction tubes 3. In the latter fashion, a uniform charging of all of the suction tubes 3 is accomplished and disruption of the tobacco strands of the shredded tobacco is eliminated owing to the accumulation, upstream of the ends (unnumbered) of the suction tubes 3 and the constant circulation of the tobacco along the upper reach 12 of the conveyor 7. Hence, a gentle treatment of the tobacco is achieved while being conveyed to and at or recirculated in the area of the suction tubes 3 whence from it is fed to the individual cigarette-forming machines.

Although only a preferred embodiment of the invention has been specifically illustrated and described herein, it is to be understood that minor variations may be made in the apparatus without departing from the spirit and scope of the invention, as defined in the appended claims.

What is claimed is:

1. A device for charging cigarette machines with tobacco comprising means for establishing a collection area in the form of a trough-shaped configuration including a bottom defined by a conveyor, means for imparting motion to said conveyor in a predetermined direction, a plurality of suction tubes having terminal end portions thereof disposed within said collection area and adjacent said conveyor whereby tobacco upon said conveyor is circulated thereby and withdrawn therefrom by said suction tubes, said conveyor includes an inlet end portion and an outlet end portion as viewed in the direction of conveyor motion, and said suction tube terminal end portions are positioned generally between said inlet and outlet portions.

2. The cigarette machine charging device as is defined in claim 1 including means for delivering tobacco to said conveyor between said suction tube terminal end portions and said conveyor inlet end portion.

3. The cigarette machine charging device as is defined in claim 2 wherein said conveyor is an endless band conveyor having entrainment means thereon for entraining tobacco for assuring movement of the tobacco in said predetermined direction.

4. The cigarette machine charging device as is defined in claim 2 wherein said conveyor is an endless band conveyor having upper and lower flights with said upper flight traveling in said predetermined direction from an inlet end portion toward an outlet end portion of said conveyor, said conveyor having lateral edges, and means adjacent said inlet end portion and said upper flight for directing tobacco deposited upon said upper flight inboard and away from said lateral edges.

5. The cigarette machine charging device as is defined in claim 2 wherein said conveyor is an endless band conveyor having upper and lower flights with said upper flight traveling in said predetermined direction from an inlet end portion toward an outlet end portion of said conveyor, said conveyor having lateral edges, means adjacent said inlet end portion and said upper flight for directing tobacco deposited upon said upper flight inboard and away from said lateral edges, and said tobacco directing means further bearing against an uppermost surface of said upper flight to guide the movement thereof.

6. The cigarette machine charging device as is defined in claim 1 including means for delivering tobacco to said conveyor between said suction tube terminal end portions and said conveyor outlet end portions.

7. The cigarette machine charging device as is defined in claim 6 wherein said conveyor is an endless band conveyor having entrainment means thereon for entraining tobacco for assuring movement of the tobacco in said predetermined direction.

8. The cigarette machine charging device as is defined in claim 6 wherein said conveyor is an endless band conveyor having upper and lower flights with said upper flight traveling in said predetermined direction from an inlet end portion toward an outlet end portion of said conveyor, said conveyor having lateral edges, and means adjacent said inlet end portion and said upper flight for directing tobacco deposited upon said upper flight inboard and away from said lateral edges.

9. The cigarette machine charging device as is defined in claim 6 wherein said conveyor is an endless band conveyor having upper and lower flights with said upper flight traveling in said predetermined direction from an inlet end portion toward an outlet end portion of said conveyor, said conveyor having lateral edges, means adjacent said inlet end portion and said upper flight for directing tobacco deposited upon said upper flight inboard and away from said lateral edges, and said tobacco directing means further bearing against an uppermost surface of said upper flight to guide the movement thereof.

10. A device for charging cigarette machines with tobacco comprising means for establishing a collection area in the form of a trough-shaped configuration including a bottom defined by a conveyor, means for imparting motion to said conveyor in a predetermined direction, a plurality of suction tubes having terminal end portions thereof disposed within said collection area and adjacent said conveyor whereby tobacco upon said conveyor is circulated thereby and withdrawn therefrom by said suction tubes, and said conveyor is an endless band conveyor having entrainment means thereon for entraining tobacco for assuring movement of the tobacco in said predetermined direction.

11. The cigarette machine charging device as is defined in claim 10 including side walls bounding said conveyor and said trough-shaped collection area.

12. A device for charging cigarette machines with tobacco comprising means for establishing a collection area in the form of a trough-shaped configuration including a bottom defined by a conveyor, means for imparting motion to said conveyor in a predetermined direction, a plurality of suction tubes having terminal end portions thereof disposed within said collection area and adjacent said conveyor whereby tobacco upon said conveyor is circulated thereby and withdrawn therefrom by said suction tubes, and said conveyor is an endless band conveyor having a plurality of generally parallel, spaced entrainment strips disposed along the peripheral extent of said conveyor within which tobacco is entrained to assure its movement in said predetermined direction.

13. The cigarette machine charging device as is defined in claim 12 including side walls bounding said conveyor and said trough-shaped collection area.

14. A device for charging cigarette machines with tobacco comprising means for establishing a collection area in the form of a trough-shaped configuration including a bottom defined by a conveyor, means for imparting motion to said conveyor in a predetermined direction, a plurality of suction tubes having terminal end portions thereof disposed within said collection area and adjacent said conveyor whereby tobacco upon said conveyor is circulated thereby and withdrawn therefrom by said suction tubes, said conveyor is an endless band conveyor having upper and lower flights with said upper flight traveling in said predetermined direction from an inlet end portion toward an outlet end portion of said conveyor, said conveyor having lateral edges, and means adjacent said inlet end portion and said upper flight for directing tobacco deposited upon said upper flight inboard and away from said lateral edges.

15. The cigarette machine charging device as is defined in claim 14 wherein said tobacco directing means further bears against an upper most surface of said upper flight to guide the movement thereof.

16. A device for charging cigarette machines with tobacco comprising means for establishing a collection area in the form of a trough-shaped configuration including a bottom defined by a conveyor, means for imparting motion to said conveyor in a predetermined direction, a plurality of suction tubes having terminal end portions thereof disposed within said collection area and adjacent said conveyor whereby tobacco upon said conveyor is circulated thereby and withdrawn therefrom by said suction tubes, and said conveyor is an endless band conveyor having upper and lower flights with said upper flights traveling in said predetermined direction from an inlet end portion toward an outlet end portion of said conveyor.

17. The cigarette machine charging device as is defined in claim 16 including means at said outlet end portion for preventing the discharge of tobacco which has not been removed by said suction tubes.

* * * * *